United States Patent Office 2,833,716
Patented May 6, 1958

2,833,716

PROCESS FOR PURIFYING AND INCREASING COMBINED CALCIUM OF CALCIUM SULFONATES

John F. Collins, Elizabeth, N. J., assignor to Esso Research and Engineering Company, a corporation of Delaware No Drawing. Application August 7, 1953
Serial No. 373,037

3 Claims. (Cl. 252—33.4)

This invention relates to an improvement in the manufacture of oil-soluble calcium sulfonates from petroleum sulfonic acids, e. g. mahogany acids, or from synthetic alkyl aromatic sulfonic acids.

This invention is more specifically concerned with a step of producing a high alkalinity calcium sulfonate while eliminating residual calcium chloride contaminant of the sulfonate. The high alkalinity in the form of combined calcium in calcium sulfonate is desirable for satisfactory motor oil detergents.

By the method of the present invention, the residual calcium chloride impurity or purposely added calcium chloride is made to react with an alkali metal hydroxide, e. g. strong NaOH aqueous solution, added in a controlled amount to prevent the presence of excess sodium hydroxide in an oil solution of the calcium sulfonate preferably before it is heated and filtered.

The controlled addition of the caustic solution to the oil solution of the calcium sulfonate containing a small amount of calcium chloride eliminates the solids handling difficulties normally associated with the conventional liming process, wherein solid or dry calcium hydroxide is employed as the liming agent.

The sodium hydroxide reacts with the residual calcium chloride from double decomposition of an original sodium sulfonate with added calcium chloride in the formation of calcium sulfonate. The reaction of the sodium hydroxide with the calcium chloride forms a fresh precipitate of finely divided calcium hydroxide.

Under these conditions the reaction is in the direction toward the precipitate formation, and as the amount of sodium hydroxide added is calculated to react with the residual calcium chloride present in up to about stoichiometrical amount (2 moles NaOH per mole $CaCl_2$), there is no excess sodium hydroxide left as a residue in the calcium sulfonate.

Various known methods of forming the calcium sulfonate are typified by U. S. Patent 2,467,176, wherein residual calcium chloride is removed from the oil solution by washing.

In the usual well known process of forming the sulfonates, a hydrocarbon oil, e. g. a phenol raffinate, obtained in making white oil or a synthesized $C_{18}+$ alkyl aromatic hydrocarbon is treated with oleum to form the sulfonic acids. The acid oil is separated from the heavier sulfuric acid sludge, then is neutralized with sodium carbonate to form sodium sulfonates which are soluble in the oil.

To convert the sodium sulfonates to calcium sulfonates an excess amount of calcium chloride brine is admixed with the oil solution of the sodium sulfonates, and the resulting mixture is heated with stirring at 200° F. for about 15 minutes. The reaction mixture is settled while hot, e. g. in about 3 hours, at 200° F. The lower aqueous layer of spent brine salt is discarded, and the upper layer of oil containing crude calcium sulfonate contains some residual calcium chloride.

At this point of the operation up to as much as about 0.5 mole residual calcium chloride per mole of sulfonate tends to be present. Generally, this proportion is normally obtained. Various methods have been used and proposed for removing the calcium chloride. Some methods are intended to eliminate the salt by precipitation. Others use washing. Such methods give difficulties in the formation of thick solid-like concentrates, which flow with difficulty and are not suitable for dehydration. Still other methods involve a further addition of calcium hydroxide which gives handling and other difficulties.

In using the method of the present invention, that of adding a controlled proportion of aqueous sodium hydroxide to react with the calcium chloride in the oil solution of calcium sulfonates, it has been observed that the finely divided and freshly precipitated calcium hydroxide thus formed is highly soluble in the oil solution of the calcium sulfonates. When such a solution is heated to drive off water and then filtered while hot, sodium chloride is filtered out without substantial lowering of the calcium content of the oil solution.

The following examples show comparative results in using dry lime and a strong aqueous alkaline solution for treating samples of a neutral calcium sulfonate in oil solution containing 30 weight percent calcium sulfonate having a molecular weight of 934 and containing about 3.4 weight percent of calcium chloride.

EXAMPLES

In one experiment 0.75 mole of the dry calcium hydroxide was added per mole of calcium sulfonate in the solution to provide a substantial excess of lime with respect to the calcium chloride in the oil solution of calcium sulfonate.

To the other sample, only a sufficient amount of strong aqueous caustic solution was added as was needed to react with the residual calcium chloride, about 33⅓% less on a mole equivalent basis.

Both samples were then subjected to the same kind of dehydration and filtering after which the neutralization number of the samples was determined. The sodium hydroxide treated sulfonate sample shows a comparatively similar high alkalinity to the sulfonate sample treated with a larger proportion of dried calcium hydroxide.

Table I.—*Comparative tests on alkalizing Ca sulfonate* [1] *using solid* $Ca(OH)_2$ *and NaOH*

| Alkalizing Agent | 25% NaOH Solution | Solid $Ca(OH)_2$ |
|---|---|---|
| Solids Handling Problem | No | Yes |
| Mole Equivalent of Agent: | | |
| NaOH/mole Ca Sulfonate [2] | 0.50 | |
| $Ca(OH)_2$ mole Ca Sulfonate | | 0.75 |
| Mixing and Dehydrating Temp., °F | 300 | 300 |
| Neutralization No., mg. KOH/g. Sample [3] | 15.3 | 16.2 |

[1] Concentrations: Ca sulfonate in oil, wt. percent: 30.0. $CaCl_2$, wt. percent: 3.4.
[2] Based on equivalent moles of $Ca(OH)_2/1$ mole calcium sulfonate.
[3] Determined by back titration with acid per A. S. T. M.

In tests such as shown above for illustrative purposes, practically the same high alkalinity of about 16 Neut. No. was obtained in the calcium sulfonate solutions by the freshly precipitated lime formed by addition of the NaOH as was obtaind by addition of solid $Ca(OH)_2$.

Quite unlike known methods of treating calcium sulfonates, the present method is adapted for the addition of calcium chloride and sodium hydroxide in accurately measured proportions to a petroleum oil solution of calcium sulfonates which may or may not be contaminated by small amounts of calcium chloride. The reaction between the sodium hydroxide, calcium chloride and the calcium sulfonate brings about the formation of a basic calcium sulfonic acid salt which remains in solution when the solution is dehydrated and then filtered to remove precipitated sodium chloride.

In adding aqueous caustic or alkali metal hydroxide to the oil solution, this addition may be made to the calcium sulfonate preferably dissolved in hydrocarbon oil or similar organic solvent for the sulfonates. The calcium sulfonate concentration in the solution is usually from about 30 to 50 wt. percent but may vary over a wider range.

It is advantageous to have about .5 mole of calcium chloride present per mole of the calcium sulfonate in obtaining the desired high alkalinity by reaction with added caustic. Somewhat smaller or larger amounts of residual calcium chloride may be present in the oil solution; then calcium chloride may be added to make up for the deficiency, or some calcium chloride may be removed from the solution, if desired, before addition of caustic.

The alkali metal hydroxide is preferably added as a strong caustic aqueous solution in controlled amount to facilitate the later dehydration.

Following the addition of the caustic solution to a concentrated oil solution of calcium sulfonates containing the required calcium chloride, more oil may be added to dilute the mixture in order to aid in mixing and filtering which follows the reaction and dehydration. A preferred concentration of the sulfonates is about 30 wt. percent in the oil during the reaction and filtering. The reaction and dehydration occur at temperatures in the range of 80 to 300° F., and can be made to take place simultaneously. The filtering is carried out at elevated temperatures close to 300° F. and with the help of filter aids, e. g. diatomaceous earth. A clear filtered solution of the oil containing the dissolved calcium sulfonates combined with the freshly formed calcium hydroxide is obtained.

Further comparative tests were made to demonstrate advantages over other methods which do not alkalize substantial amounts of calcium chloride with an alkali metal hydroxide. In these tests samples of an oil containing 32.22% calcium sulfonate and about 0.5 mole of calcium chloride per mole of sulfonate were used. The improved alkalinity obtained with NaOH reaction is shown in the following Table II.

*Table II*

| Test Condition | Neutralization No. |
|---|---|
| (1) 0.3 mole dry lime added/mole Ca Sulfonate | 9.82 |
| (2) 0.3 mole lime equiv. of NaOH added/mole Ca Sulfonate | 10.81 |

Tests showed that no substantial increase was made in sodium content by adding the NaOH after dehydrating and filtering and this is a desirable factor. To avoid excess of alkali metal in the finished product and to obtain the best quality basic calcium sulfonate-oil product, the proportions of reactants in the oil should be of the order of 2 moles NaOH/1 mole $CaCl_2$/2 moles Ca sulfonate. If the amount of calcium chloride alkalized (converted to $Ca(OH)_2$) is much less, then the sodium content is increased in the final product. If it is much more, the desired alkalinity increase is not obtained.

Having described the invention, it is claimed as follows:

1. A method of purifying an oil solution of calcium sulfonate and increasing the alkalinity thereof, said solution containing residual calcium chloride, which comprises adding to said solution an amount of aqueous sodium hydroxide sufficient to convert substantially all of the calcium chloride to calcium hydroxide soluble in said solution, heating said solution to dehydrate and precipitate sodium chloride and removing the precipitated sodium chloride from said solution.

2. In forming a purified oil solution of basic calcium sulfonates from an impure petroleum oil solution of calcium sulfonates containing residual calcium chloride, the improvement which comprises admixing a strong aqueous sodium hydroxide solution with said impure oil solution to incorporate therein 2 moles of sodium hydroxide per mole of calcium chloride and per 2 moles of calcium sulfonate, heating the resulting mixture under conditions and for a time sufficient to convert the calcium chloride to hydroxide and convert the sodium hydroxide to sodium chloride at temperatures in the range of 80° to 300° F., dehydrating the oil solution to leave basic calcium sulfonate in solution and precipitate the sodium chloride from the solution, then filtering the solution to remove sodium chloride.

3. In the formation of a petroleum oil solution of basic calcium sulfonate, the improvement which comprises admixing with petroleum oil solution of about 30 to 50 wt. percent oil-soluble calcium sulfonates from petroleum sulfonic acids containing a substantial amount of calcium chloride a strong aqueous solution of sodium hydroxide in an amount sufficient to react 2 moles of sodium hydroxide per mole of the calcium chloride and per 2 moles of the calcium sulfonate, heating the resulting mixture to about 300° F. until fresh calcium hydroxide and sodium chloride precipitate are formed in said solution, simultaneously driving off water from the solution at about 300° F., then while the solution is still hot filtering said solution to remove sodium chloride precipitate therefrom.

References Cited in the file of this patent

UNITED STATES PATENTS

| | | |
|---|---|---|
| 2,413,311 | Cohen | Dec. 31, 1946 |
| 2,453,690 | Bray | Nov. 16, 1948 |
| 2,501,731 | Mertes | Mar. 28, 1950 |